US011143528B2

(12) United States Patent
Hino et al.

(10) Patent No.: US 11,143,528 B2
(45) Date of Patent: Oct. 12, 2021

(54) OPTICAL FIBER SENSOR AND ANALYSIS METHOD

(71) Applicant: NEC Corporation, Tokyo (JP)

(72) Inventors: Tomoyuki Hino, Tokyo (JP); Akihiro Tanaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/041,612

(22) PCT Filed: Mar. 26, 2019

(86) PCT No.: PCT/JP2019/012880
§ 371 (c)(1),
(2) Date: Sep. 25, 2020

(87) PCT Pub. No.: WO2019/189192
PCT Pub. Date: Oct. 3, 2019

(65) Prior Publication Data
US 2021/0010836 A1 Jan. 14, 2021

(30) Foreign Application Priority Data
Mar. 27, 2018 (JP) .............................. JP2018-060381

(51) Int. Cl.
G01D 5/353 (2006.01)

(52) U.S. Cl.
CPC ..... G01D 5/35361 (2013.01); G01D 5/35358 (2013.01)

(58) Field of Classification Search
CPC .................. G01D 5/35361; G01D 5/35358
See application file for complete search history.

(56) References Cited

U.S. PATENT DOCUMENTS 8,305,228 B2    11/2012  Vigneaux
2005/0259241 A1* 11/2005  Tanigawa ........... G01M 11/3181
                                          356/73.1
(Continued)

FOREIGN PATENT DOCUMENTS

JP    H07-055332 A    3/1995
JP    2000-139081 A   5/2000
(Continued)

OTHER PUBLICATIONS

International Search Report dated May 28, 2018, in corresponding PCT International Application.
(Continued)

*Primary Examiner* — Dominic J Bologna

(57) ABSTRACT

An optical fiber sensor irradiates light pulses into an optical fiber cable and analyses backscattered light thereof. The optical fiber sensor comprises: a determination part that determines a timing at which measurement of an environmental change starts and a timing at which measurement of the environmental change ends, based on the backscattered light; and an occurrence region estimation part that estimates an occurrence region of the environmental change in a longitudinal direction of the optical fiber cable, based on the timing at which measurement of the environmental change starts; the timing at which measurement of the environmental change ends; and a pulse width of the light pulses.

20 Claims, 9 Drawing Sheets

(56) References Cited

U.S. PATENT DOCUMENTS

| | | | | |
|---|---|---|---|---|
| 2009/0219171 | A1* | 9/2009 | Vigneaux .............. | G01B 11/14 |
| | | | | 340/854.1 |
| 2019/0219441 | A1* | 7/2019 | Cedilnik .............. | G01D 5/3539 |
| 2020/0146567 | A1* | 5/2020 | Dennis ................ | A61B 5/7239 |

FOREIGN PATENT DOCUMENTS

| | | |
|---|---|---|
| JP | 2004-092975 A | 3/2004 |
| JP | 3113937 U | 9/2005 |
| JP | 2010-160081 A | 7/2010 |
| JP | 2011-055281 A | 3/2011 |
| JP | 2017-011426 A | 1/2017 |

OTHER PUBLICATIONS

Bao et al.; "Recent Progress in Distributed Fiber Optics Sensors", Sensors 2012, vol. 12, pp. 8601-8639 (2012).
Japanese Office Action for JP Application No. 2020-510918 dated Aug. 3, 2021 with English Translation.

\* cited by examiner

OPTICAL FIBER SENSOR AND ANALYSIS METHOD

CROSS-REFERENCE TO RELATED APPLICATIONS

This application is a National Stage Entry of International Application No. PCT/JP2018/012880, filed Mar. 26, 2019. The present invention is based on claiming priority of Japanese Patent Application No. 2018-060381 (filed on Mar. 27, 2018). The entire contents of the above-referenced applications are expressly incorporated herein by reference.

FIELD

The present invention relates to an optical fiber sensor, a monitoring system, an analysis method and a program.

BACKGROUND

Optical fiber sensors are widely introduced in usages such as, for example, for maintenance of optical fiber for communication and infrastructure abnormality diagnosis (for example, see non patent literature (NPL) 1).

As usage for maintenance of optical fiber for communication, an OTDR (Optical Time Domain Reflectometry) scheme is adopted. The OTDR is a scheme in which light pulses are transmitted from a transmission terminal of a measurement apparatus, and change of intensity of backscattered light (light reflected in the direction of arrival of a wave or particle or signal) is measured, wherein the backscattered light is called as Rayleigh scattered light (light scattering by particles smaller than the wavelength of light) inside an optical fiber and returns in a direction opposite to the transmitted light pulses. If there is an abnormal loss at a connection point of an optical fiber such as an optical connector or the like, the light intensity of the backscattered light increases as from that location. The abnormal location can be specified by calculating from propagation time from the light pulses being transmitted to the backscattered light being measured.

Also, as usage applied to the diagnosis of abnormality in an infrastructure, a BOTDR (Brillouin Optical Time Domain Reflectometer) scheme is adopted. Although the BOTDR transmits light pulses from a transmission terminal similarly to the abovementioned OTDR, the type of backscattered light being measured is different. In the BOTDR, backscattered light called as Brillouin scattered light (scattered light where there is a small frequency shift by interaction of light and sound waves in a material) is measured. Since this Brillouin scattered light has a property that causes a frequency shift when a strain or the like is applied in an optical fiber, it is determined whether or not the strain is applied in the fiber by measuring this frequency shift amount.

As described above, optical fiber sensors are widely applied for the purpose of detecting an abnormal at a connection point of an optical fiber or measuring strain.

[NPL 1]: Xiaoyi Bao and Liang Chen, "Recent Progress in Distributed Fiber Optics Sensors", Sensors 2012, 12, 8601-8639

SUMMARY

The following analysis is given by the inventors of the present invention.

In recent years, new usages have also increased in optical fiber sensing, by innovation in devices for optical networks such as a coherent (a property that wave motions interfere with one another) receiving scheme, or line width narrowing for a laser spectrum. By being able to measure a state change of an optical phase, parameters that can be detected by an optical fiber sensor are not only reflection amount or strain as heretofore, but are also extended to environmental changes such as temperature, vibration, sound or the like, and improvement is desired in accuracy in specifying location where environmental change occurs.

The present invention has been realized by giving consideration to the abovementioned desire, and it is an object of the invention to provide an optical fiber sensor, a monitoring system, an analysis method and a program, that can contribute to improving accuracy in specifying the location at which an environmental change occurs.

An optical fiber sensor according to a first aspect irradiates light pulses into an optical fiber cable and analyses backscattered light thereof, wherein the sensor comprises: a determination part that determines a timing at which measurement of an environmental change starts and a timing at which measurement of the environmental change ends, based on the backscattered light; and an occurrence region estimation part that estimates an occurrence region of the environmental change in a longitudinal direction of the optical fiber cable, based on: the timing at which measurement of the environmental change starts; the timing at which measurement of the environmental change ends; and a pulse width of the light pulses.

A monitoring system according to a second aspect, comprises: an optical fiber sensor; a monitoring camera that is configured to be able to direct to a location at which the optical fiber cable is disposed; and a monitoring apparatus connected to enable communication with the optical fiber sensor and the monitoring camera, wherein the monitoring apparatus controls to direct the monitoring camera to the occurrence region, when the occurrence region estimation part estimates an occurrence region of the environmental change in a longitudinal direction of the optical fiber cable.

An analysis method according to a third aspect, that comprises: irradiating light pulses into an optical fiber cable and analyzing backscattered light thereof, the analysis method comprising: determining a timing at which measurement of an environmental change starts and a timing at which measurement of the environmental change ends, based on the backscattered light; and estimating an occurrence region of the environmental change in a longitudinal direction of the optical fiber cable, based on the timing at which measurement of the environmental change starts; the timing at which measurement of the environmental change ends; and a pulse width of the light pulses.

A program according to a fourth aspect, executed in an optical fiber sensor that irradiates light pulses into an optical fiber cable and analyses backscattered light thereof, the program causes to: determine a timing at which measurement of an environmental change starts and a timing at which measurement of the environmental change ends, based on the backscattered light; and estimate an occurrence region of the environmental change in a longitudinal direction of the optical fiber cable, based on the timing at which measurement of the environmental change starts; the timing at which measurement of the environmental change ends; and a pulse width of the light pulses. It should be noted that the program can be recorded on a computer-readable storage medium. The storage medium can be a non-transient medium such as a semiconductor memory, a hard disk, a magnetic recording medium, an optical recording medium or the like. Also, in the present disclosure, the program can be embodied as a computer program product. The program is inputted to a computer apparatus from an input apparatus or an outside via a communication interface, and is stored in a storage device, thereby a processor can be driven according to predetermined steps or processing; a processing result thereof including intermediate states can be displayed via a display apparatus for each stage thereof as necessary; or the computer apparatus can communicate with the outside via a communication interface. A computer apparatus for that, as an example, comprises: a processor that can be typically interconnected by a bus; a storage device; an input apparatus; a communication interface; and a display apparatus as necessary.

According to the abovementioned first to fourth aspects, it is possible to contribute to improving accuracy in specifying the location where an environmental change occurs.

PREFERRED MODES

Figure 1:
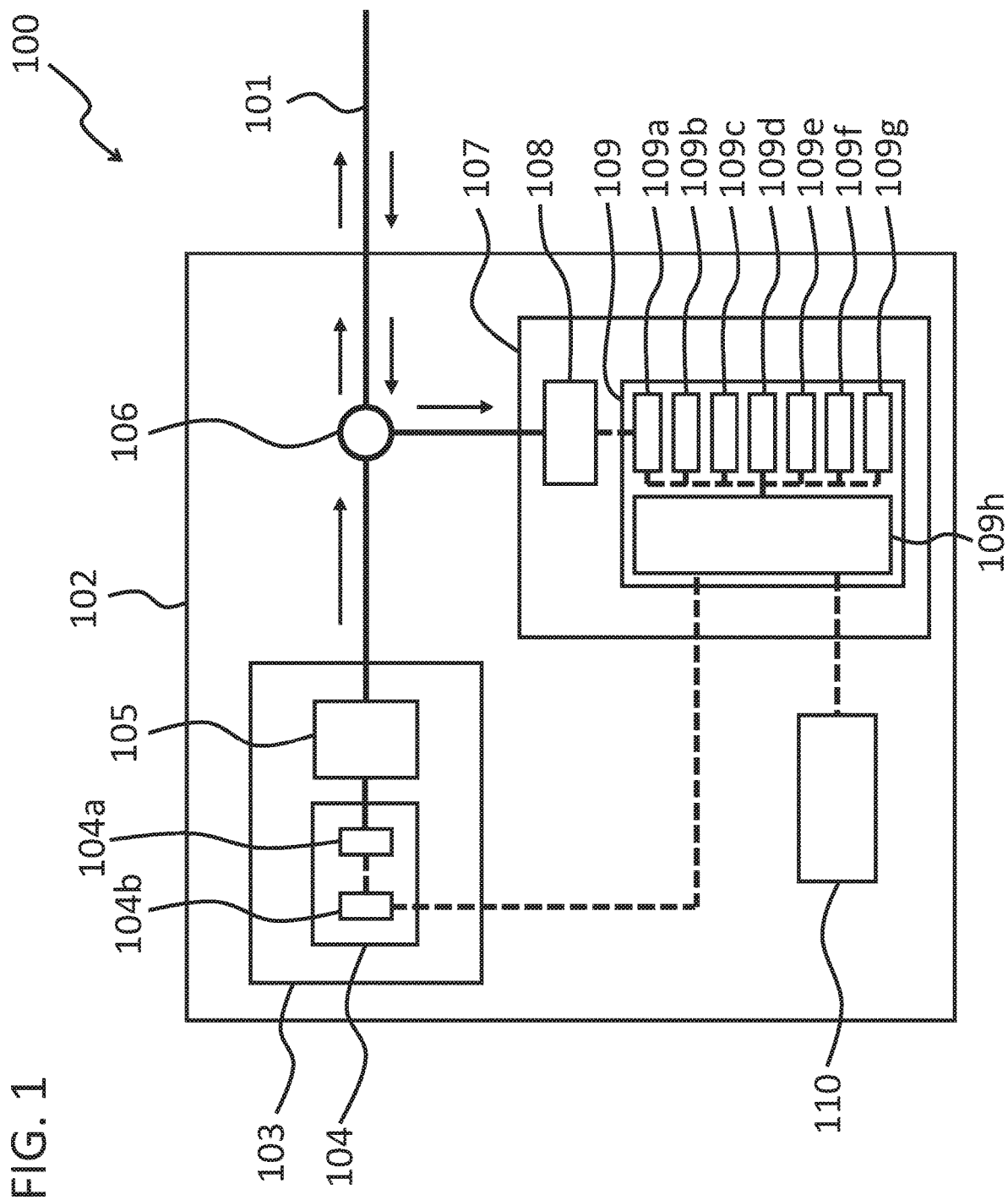
FIG. 1 is a block diagram schematically showing a configuration of an optical fiber sensor according to a first exemplary embodiment.

Hereinafter, exemplary embodiments are described with reference to the drawings. It should be noted that when reference symbols in the drawings are attached in the present application, these are solely for the purpose of aiding understanding, and are not intended to limit the invention to modes shown in the drawings. Also, the following embodiments are merely examples, and the present invention is not limited thereto. Further, connection lines between blocks in the diagrams referred to in the following description include both unidirectional or bidirectional. Unidirectional arrows schematically show flow of main signals (data), but do not exclude bidirectionality. Furthermore, although explicit illustration is omitted in the circuit diagrams, block diagrams, internal configuration diagrams, connection diagrams and the like shown in the disclosure of the present application, input ports and output ports are present at respective input terminals and output terminals of each connection line. The same applies for input output interfaces. The program is executed through a computer apparatus; the computer apparatus comprises, for example, a processor, a storage device, an input apparatus, a communication interface, and a display apparatus as necessary; and the computer apparatus is configured to enable communication, either wired or wireless, with equipment (including a computer) inside or outside the apparatus, via a communication interface.

First Exemplary Embodiment

An optical fiber sensor according to a first exemplary embodiment will be described with reference to the drawings. FIG. 1 is a block diagram schematically showing a configuration of an optical fiber sensor according to the first exemplary embodiment.

The optical fiber sensor 100 is an apparatus that detects an environmental change such as reflection amount, strain, temperature, vibration or sound, using an optical fiber cable 101 that is a medium for sensing. The optical fiber sensor 100 comprises: an optical fiber cable 101; and an apparatus main body 102.

Figure 2:
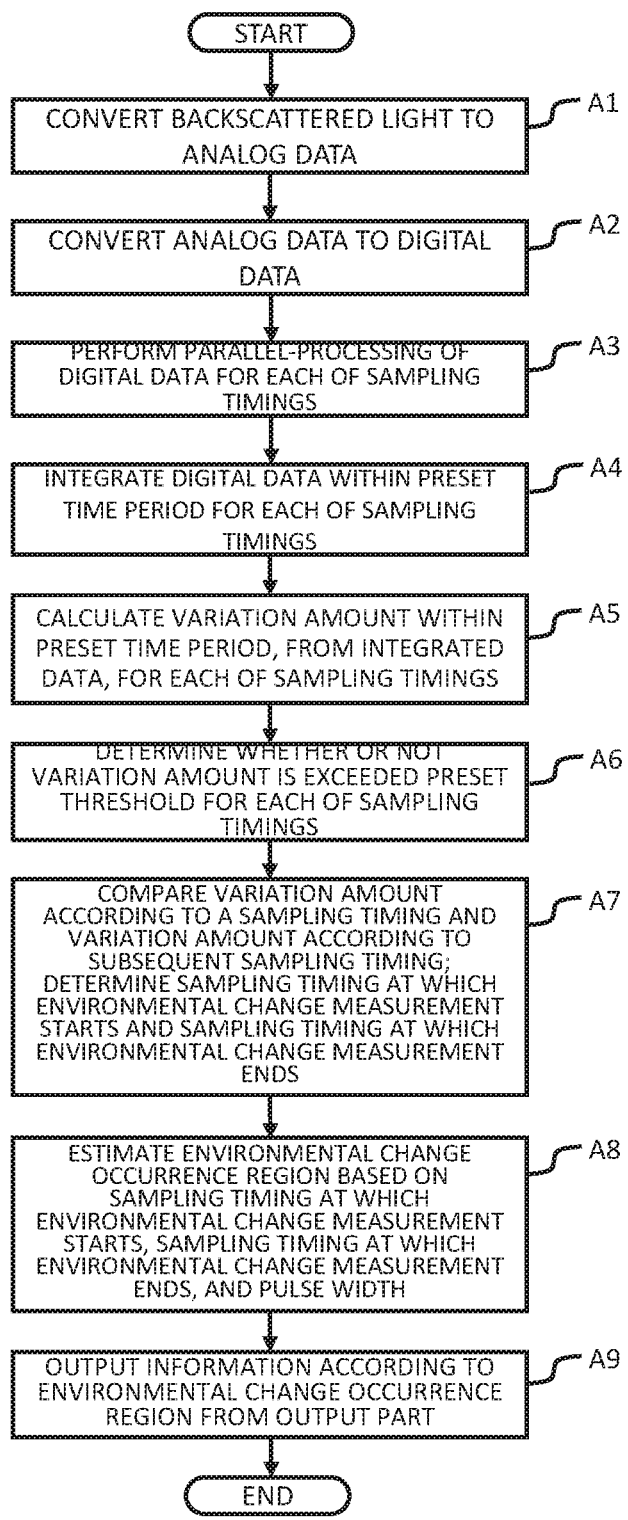
FIG. 2 is a sequence schematically showing operations of a data processing apparatus in the optical fiber sensor according to the first exemplary embodiment.

The optical fiber cable 101 is a linear cable that detects an environmental change(s) such as reflection amount, strain, vibration or sound, using light (see FIGS. 1 and 2). The optical fiber cable 101 transmits light. As the optical fiber cable 101, it is possible to use, for example, a material that enables transmission of light such as plastic or quartz glass in fibrous form, and use a double layer structure composed of a central core and clad covering the circumference of the core. One end of the optical fiber cable 101 is connected to a circulator 106 of the apparatus main body 102. The optical fiber cable 101 can be arranged or connected to an object (target body to be detected) that detects an environmental change(s) such as reflection amount, strain, temperature, vibration, sound or the like; for example, it can be connected to a communication optical fiber cable for which an abnormal loss at a connection point is to be detected, and it can be arranged on the outside of an equipment for which an abnormality is to be detected.

The apparatus main body 102 is a main body of the optical fiber sensor 100 (see FIG. 1). A transmission part 103, the circulator 106, a reception part 107 and an output part 110 are mounted on the apparatus main body 102.

The transmission part 103 is a function part that transmits light (see FIG. 1). The transmission part 103 comprises a light source apparatus 104 and a light modulator 105.

The light source apparatus 104 is a function part that outputs light (see FIG. 1). The light source apparatus 104 comprises: a light output element 104a; and a drive circuit 104b that drives the light output element 104a. The light output element 104a can use ones having a narrow line width with high coherence; for example, a semiconductor laser, a laser diode (LD), a wavelength tunable LD, a Super Luminescent Diode (SLD), an ASE (Amplified Spontaneous Emission) light source, or a LED (Light Emitting Diode) can be used. The drive circuit 104b is a circuit that drives the light output element 104a. The drive circuit 104b drives the light output element 104a, so as to oscillate light pulses of a prescribed period (pulse width) from the light output element 104a, by control of a data processing apparatus 109.

The light pulses outputted from the light source apparatus 104 are outputted towards the light modulator 105 via a light path.

The light modulator 105 is an instrument (apparatus) that modulates light pulses outputted from the light source apparatus 104 (see FIG. 1). The light modulator 105 can change light wavelength, frequency, intensity, phase or the like, by control of the data processing apparatus 109. The light pulses modulated by the light modulator 105 are outputted towards the circulator 106 via a light path.

The circulator 106 is a part that outputs backscattered light towards a light detector 108 of the reception part 107 via a light path, the backscattered light being light pulses returned from the optical fiber cable 101 by irradiating light pulses outputted from the light modulator 105 towards the optical fiber cable 101 (see FIG. 1).

The light reception part 107 is a function part that receives backscattered light (see FIG. 1). The light reception part 107 comprises the light detector 108 and the data processing apparatus 109.

The light detector 108 is an instrument (apparatus, light sensor, light receiving element) that converts the received backscattered light to analog data (see FIG. 1). The light detector 108 can use a photo diode (PD: photo detector), for example. The analog data (analog data according to backscattered light) outputted from the light detector 108 is outputted towards the data processing apparatus 109.

The data processing apparatus 109 is an apparatus that processes (analyzes) analog data according to the backscattered light outputted from the light detector 108 (see FIG. 1). As the data processing apparatus 109, for example, a semiconductor integrated circuit apparatus can be used, a central processing apparatus that can execute a program can be used, or a combination of these apparatuses can be used. The data processing apparatus 109 comprises: an analog-digital conversion part 109$a$; a parallel-processing part 109$b$; an integration part 109$c$; a variation amount calculation part 109$d$; a threshold decision part 109$e$; a comparison part 109$f$; an occurrence region estimation part 109$g$; and a control part 109$h$.

The analog-digital conversion part 109$a$ is a function part that converts analog data (analog data according to backscattered light) outputted from the light detector 108 to digital data (see FIG. 1). Digital data (digital data according to backscattered light) converted by the analog-digital conversion part 109$a$ is outputted towards the parallel-processing part 109$b$.

The parallel-processing part 109$b$ is a function part that samples digital data according to backscattered light of light pulses outputted from the analog-digital conversion part 109$a$ at a specific frequency, and performs parallel-processing for each of sampling timings (see FIG. 1). The parallel-processing period corresponds to round-trip time (period) of light pulses at a longest measurement point of the optical fiber cable 101. That is, light pulses are transmitted by the transmission part 103, reach the longest measurement point (distance at time of sampling timing: $t_n$) on the optical fiber cable 101, and a period of the parallel-processing corresponds to the time (period) from the measurement point until the backscattered light returns to the reception part 107. Accordingly, data of backscattered light returned from the same place is normally related to the same processing plane (or layer). Digital data (digital data according to backscattered light) for each of sampling timings in which parallel-processing is performed by the parallel-processing part 109$b$ is outputted towards the integration part 109$c$.

The integration part (integrator) 109$c$ is a function part that calculates integration data that is obtained by integrating digital data according to backscattered light in which parallel-processing is performed by the parallel-processing part 109$b$ within a preset time period (see FIG. 2, A4) for each of sampling timings (see FIG. 1, also FIG. 2). Integration data (integration data according to backscattered light) at each specific sampling timing that has been integrated by the integration part 109$c$ is outputted towards the variation amount calculation part 109$d$.

The variation amount calculation part 109$d$ is a function part that calculates variation amount (variation amount according to backscattered light) of integration data that has been integrated by the integration part 109$c$, for each of sampling timings (see FIG. 1, also FIG. 2). The variation amount for each of sampling timings calculated by the variation amount calculation part 109$d$ is outputted towards the threshold decision part 109$e$ and the comparison part 109$f$.

The threshold decision part 109$e$ is a function part that decides whether or not the variation amount calculated by the variation amount calculation part 109$d$ exceeds a preset threshold (see FIG. 1, also FIG. 2). In a case where the threshold is exceeded, the threshold decision part 109$e$ decides that there is an environmental change. In a case where the threshold is not exceeded, the threshold decision part 109$e$ decides that there is no environmental change.

The comparison part 109$f$ is a function part that compares a variation amount according to one sampling timing (time period from first to (n−1)th timing to be sampled) calculated by the variation amount calculation part 109$d$, and a variation amount according to another sampling timing (from 2nd to (n)th timing) subsequent to the one sampling timing (time period from first to (n−1)th timing to be sampled) (see FIG. 1, also FIG. 2). The comparison part 109$f$ determines a start of measurement of environmental change at a sampling timing when the variation amount becomes from a state less than the threshold to a state greater than or equal to the threshold between the compared variation amounts; and determines an end of measurement of environmental change at a sampling timing when the variation amount becomes from a state greater than or equal to the threshold to a state less than the threshold.

The occurrence region estimation part 109$g$ is a function part that estimates an occurrence region of the environmental change (see FIG. 1). The occurrence region estimation part 109$g$ estimates an occurrence region of the environmental change in a longitudinal direction of an optical fiber cable, based on: a sampling timing at which measurement of environmental change determined by the comparison part 109$f$ is started; a sampling timing at which measurement of environmental change is ended; and a pulse width controlled with respect to the drive circuit 104$b$ of the light source apparatus 104 by the control part 109$h$.

The control part 109$h$ is a function part that controls the analog-digital conversion part 109$a$, the parallel-processing part 109$b$, the integration part 109$c$, the variation amount calculation part 109$d$, the threshold decision part 109$e$, the comparison part 109$f$, the occurrence region estimation part 109$g$, the drive circuit 104$b$ of the light source apparatus 104, and an output part 110 (see FIG. 1). The control part 109$h$ controls so that light pulses are oscillated at a prescribed period (pulse width) from the light output element 104$a$, by controlling the light output element 104$a$ via the drive circuit 104$b$. The control part 109$h$ controls to cause the output part 110 to output information (display, sound output, printing, or the like). The control part 109$h$ controls to cause the transmission part 103 to synchronize with the reception part 107. The control part 109h controls so that the sampled time period is shorter than the pulse width. The control part 109h causes synchronization of transmission timing of light pulses outputted from the light source apparatus 104, and detection timing of backscattered light detected by the light detector 108.

The output part 110 is a function part that outputs information (see FIG. 1). The output part 110 outputs information (display, sound output, printing, signal output, or the like), by control of the control part 109h.

Next, a detection principle of the optical fiber sensor according to the first exemplary embodiment will be described.

In the optical fiber cable 101, when light pulses are transmitted by the optical fiber cable 101, faint backscattered light is propagated from all locations in the longitudinal direction of the optical fiber cable 101 through which the light pulses have passed, in a direction opposite to the travel direction of the light pulses. Although there are various types in the backscattered light, in the first exemplary embodiment, Rayleigh scattered light is measured as the backscattered light. The Rayleigh scattered light is scattered light having a frequency component the same as the transmitted light pulses. In the optical fiber cable 101, when an environmental change such as vibration or sound occurs, and the environmental change is transmitted to the optical fiber cable 101, the state of backscattered light returned from a location where the environmental change occurs, changes. Specifically, the intensity and phase of the backscattered light change. By capturing the changes of intensity and phase, it is possible to detect that an environmental change occurs. Also, with regard to specifying (identifying) the location where the changes of intensity and phase occur, it is possible to calculate which position of the optical fiber cable 101 the environmental change occurs, based on a timing (time period, pulse width are also possible) at which the light pulses were transmitted by the transmission part 103, and a timing at which the backscattered light in which changes of intensity and phase occur (i.e., time (period) from start to end of measurement), is measured.

In the optical fiber sensor that detects an environmental change such as temperature, vibration, sound or the like, distance resolution and distance are determined by the width of the transmitted light pulses (pulse width). The distance resolution represents a distance in which data received between 2 points can be separated, and is half the value of a pulse width generally used. Also, the distance means a maximum distance for which sensing is possible, and assuming that power of light pulses be constant, as the pulse width get wider, the distance can be longer. That is, the distance resolution and distance for which sensing is possible are in a tradeoff relationship depending on the pulse width. It should be noted that if an object (target) of the optical fiber sensor is to specify a location where an environmental change occurs, rather than to detect an environmental change, there is no need for limitation with regard to pulse width.

Figure 3:
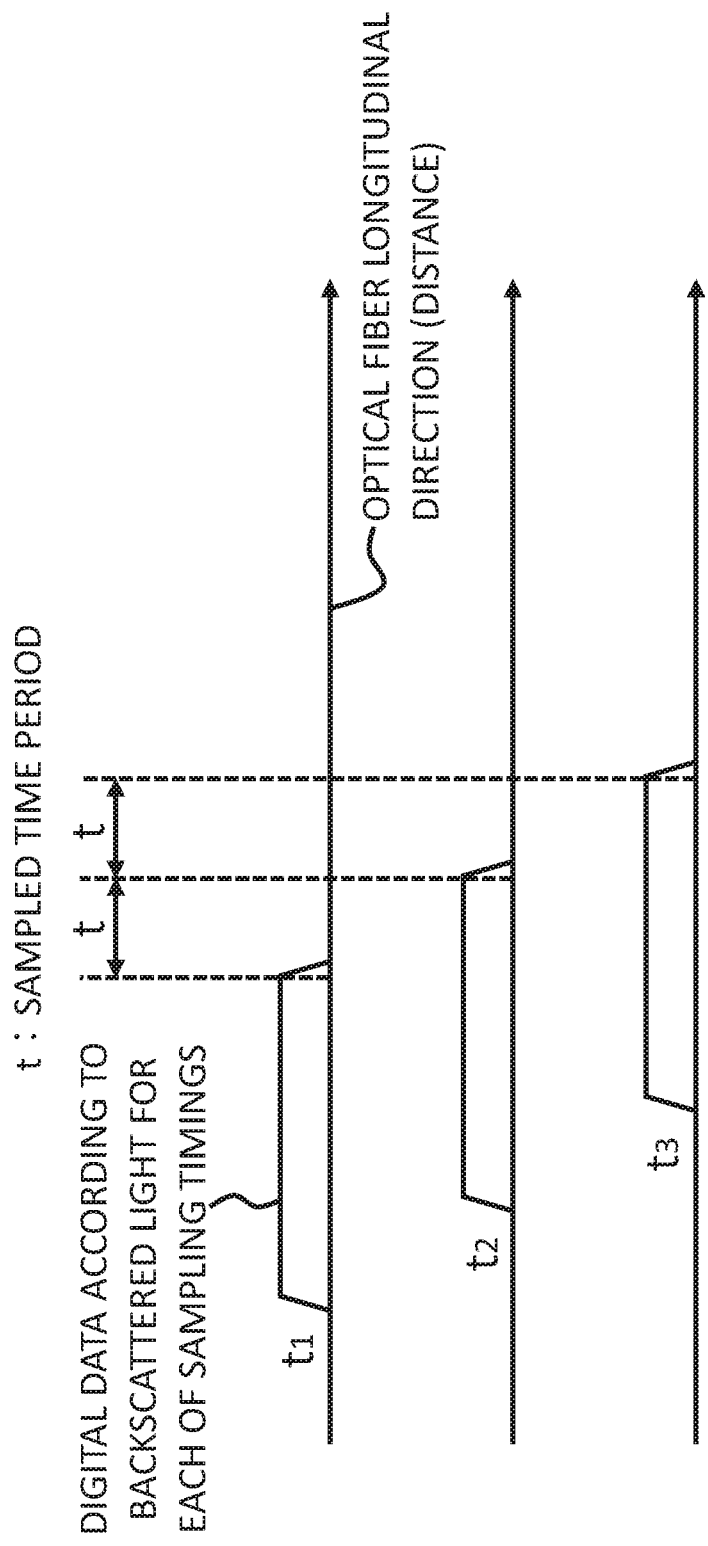
FIG. 3 is a diagram schematically showing parallel-processing for each of sampling timings, of digital data according to backscattered light of light pulses by a parallel-processing part of the data processing apparatus in the optical fiber sensor according to the first exemplary embodiment.
Figure 4:
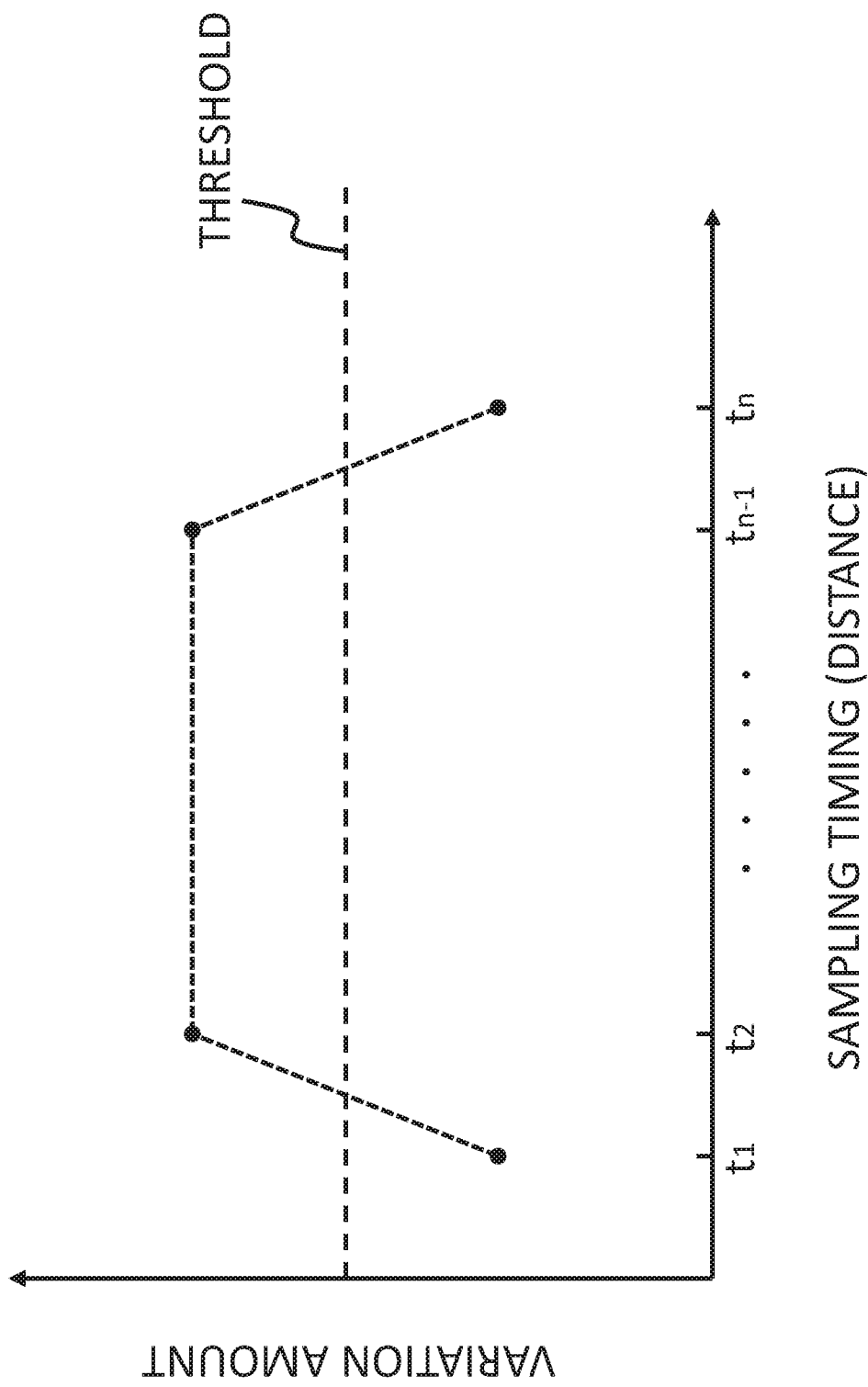
FIG. 4 is a diagram schematically showing an example of transition of variation amount for each of sampling timings, with respect to a threshold by a threshold decision part of the data processing apparatus in the optical fiber sensor according to the first exemplary embodiment.
Figure 5:
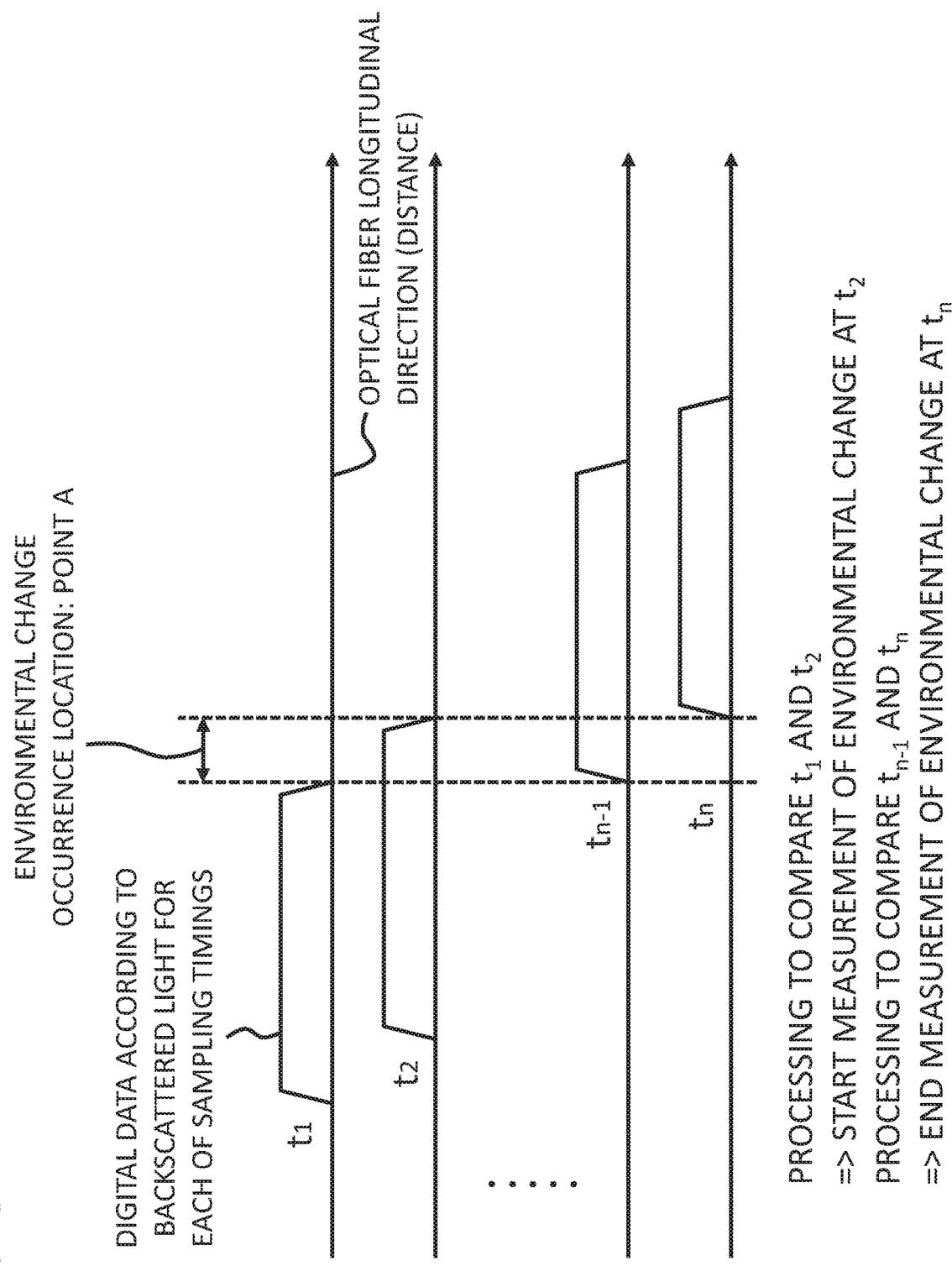
FIG. 5 is a diagram schematically showing a concept of comparison processing by a comparison part of the data processing apparatus in the optical fiber sensor according to the first exemplary embodiment.

Next, operations of a reception part in an optical fiber sensor according to the first exemplary embodiment will be described with reference to the drawings. FIG. 2 is a sequence schematically showing operations of the reception part in the optical fiber sensor according to the first exemplary embodiment. FIG. 3 is a diagram schematically showing parallel-processing for each of sampling timings of digital data according to backscattered light of light pulses by a parallel-processing part in the optical fiber sensor according to the first exemplary embodiment. FIG. 4 is a diagram schematically showing an example of a transition of a variation amount for each of sampling timings, with respect to a threshold by a threshold decision part in the optical fiber sensor according to the first exemplary embodiment. FIG. 5 is a diagram schematically showing a concept of comparison processing by a comparison part in the optical fiber sensor according to the first exemplary embodiment. With regard to configuration parts of the optical fiber sensor, please see FIG. 1.

When the backscattered light from the optical fiber cable 101 is received by the reception part 107 via the circulator 106, the light detector 108 inside the reception part 107 converts the backscattered light to analog data, and outputs the converted analog data (analog data according to the backscattered light) towards the data processing apparatus 109 (step A1).

When the converted analog data is inputted to the data processing apparatus 109, the analog-digital conversion part 109a of the data processing apparatus 109 inside the reception part 107 converts the analog data (analog data according to the backscattered light) to digital data (digital data according to the backscattered light), and outputs the converted digital data to the parallel-processing part 109b (step A2).

When the converted digital data is inputted to the parallel-processing part 109b, the parallel-processing part 109b of the data processing apparatus 109 performs sampling of digital data (digital data according to the backscattered light) at a specific frequency, performs parallel-processing of digital data (digital data according to the backscattered light) for each of sampling timings ($t_1$, $t_2$, $t_3$, . . . , $t_{n-1}$, $t_n$), and outputs the parallel-processed digital data for each of sampling timings, toward the integration part (step A3).

Here, a period of the parallel-processing corresponds to a round-trip time (period) of light pulses at a longest measurement point of the optical fiber cable 101. That is, the light pulses are transmitted by the transmission part 103 to reach the longest measurement point (distance at time of sampling timing: $t_n$) of the optical fiber cable 101, and a time (period) from then until the backscattered light of the light pulses returns to the reception part 107 is the parallel-processing period. Accordingly, data of backscattered light of the light pulses returned from the same location is normally with respect to the same processing plane (layer).

When the parallel-processed digital data for each of sampling timings, is inputted to the integration part 109c, the integration part 109c of the data processing apparatus 109 integrates the digital data (digital data according to the backscattered light) within the preset time period, for each of sampling timings, and outputs the integrated integration data (integration data according to the backscattered light) for each of sampling timings, to the variation amount calculation part 109d (step A4).

When the integrated integration data at each of integrated sampling timings is inputted to the variation amount calculation part 109d, the variation amount calculation part 109d of the data processing apparatus 109 calculates the variation amount within the preset time period from the integration data (integration data according to the backscattered light), for each of sampling timings, and outputs the calculated variation amount (variation amount according to the backscattered light) for each of sampling timings, to the threshold decision part 109e and the comparison part 109f (step A5).

When the calculated variation amount at each of sampling timings is inputted to the threshold decision part 109e, the threshold decision part 109e of the data processing apparatus 109 decides whether or not the variation amount (variation amount according to the backscattered light) exceeds a preset threshold for each of sampling timings, and in a case where the threshold is exceeded, decides that there is an environmental change, and in a case where the threshold is not exceeded, decides that there is no environmental change (step A6).

Here, in step A6, in a case where, for example, vibration occurs at a location in the longitudinal direction of an optical fiber as an environmental change, a change occurs in the phase of backscattered light returning from that location, and this appears as a change of light intensity. Therefore, a large variation amount occurs within a specified time period.

When the calculated variation amount for each of sampling timings is inputted to the comparison part 109f, the comparison part 109f of the data processing apparatus 109 compares a variation amount (variation amount according to backscattered light) according to one sampling timing (time period from first to (n−1)th timing to be sampled), and a variation amount (variation amount according to backscattered light) according to another sampling timing (time period from 2nd to (n)th timing to be sampled) subsequent to the one sampling timing (time period from first to (n−1)th timing to be sampled); determines the start of measuring of environmental change at a sampling timing when the variation amount becomes from a state less than the threshold to a state greater than or equal to the threshold between the compared variation amounts; and determines the end of measuring of environmental change at a sampling timing when the variation amount becomes from a state greater than or equal to the threshold to a state less than the threshold (step A7).

Here, in step A7, for example, a variation amount according to a sampling timing $t_1$ and a variation amount according to a sampling timing $t_2$ are compared, and the variation amount according to the sampling timing $t_2$ and a variation amount according to a sampling timing $t_3$, . . . , and a variation amount according to a sampling timing $t_{n-1}$ and a variation amount according to a sampling timing $t_n$ are compared in a similar way. As an example, assuming that a vibration occurs at point A in FIG. 5 in an optical fiber cable, when the sampled time period of the reception part 107 is shorter than the pulse width, due to comparison processing of the variation amount according to the sampling timing $t_1$ and the variation amount according to the sampling timing $t_2$, the variation amount of the sampling timing $t_1$ is less than the threshold; and since the variation amount of the sampling timing $t_2$ is greater than or equal to the threshold, it is understood that the measurement of the variation amount according to the sampling timing $t_2$ has started. Also, similarly, due to comparison processing of the variation amount of the sampling timing $t_{n-1}$ and the variation amount of the sampling timing $t_n$, since the variation amount of the sampling timing $t_{n-1}$ is greater than or equal to the threshold, and the variation amount of the sampling timing $t_n$ is less than the threshold, it is understood that the measurement of the variation amount has ended according to the sampling timing $t_n$.

Next, the occurrence region estimation part 109g of the data processing apparatus 109 estimates an occurrence region (occurrence location A of environmental change in FIG. 5) of an environmental change in a longitudinal direction of an optical fiber cable, based on the sampling timing ($t_2$ in FIG. 5) at which measurement of environmental change starts, the sampling timing being a result of step A7; the sampling timing ($t_n$ in FIG. 5) at which measurement of the environmental change ends; and information according to pulse width controlled with respect to the drive circuit 104b of the light source apparatus 104 by the control part 109h; and outputs information according to the estimated occurrence region of environmental change toward the control part 109h (step A8).

Here, in step A8, since the sampling timing of each of the measurement start and the measurement end and the pulse width for the environmental change can be converted to distance in the longitudinal direction of the optical fiber cable 101, it is possible to specify an occurrence region of the environmental change.

When information according to the estimated occurrence region of environmental change is inputted to the control part 109h, the control part 109h of the data processing apparatus 109 causes information according to the occurrence region of environmental change to output from the output part 110 (step A9), and ends after that.

Figure 6:
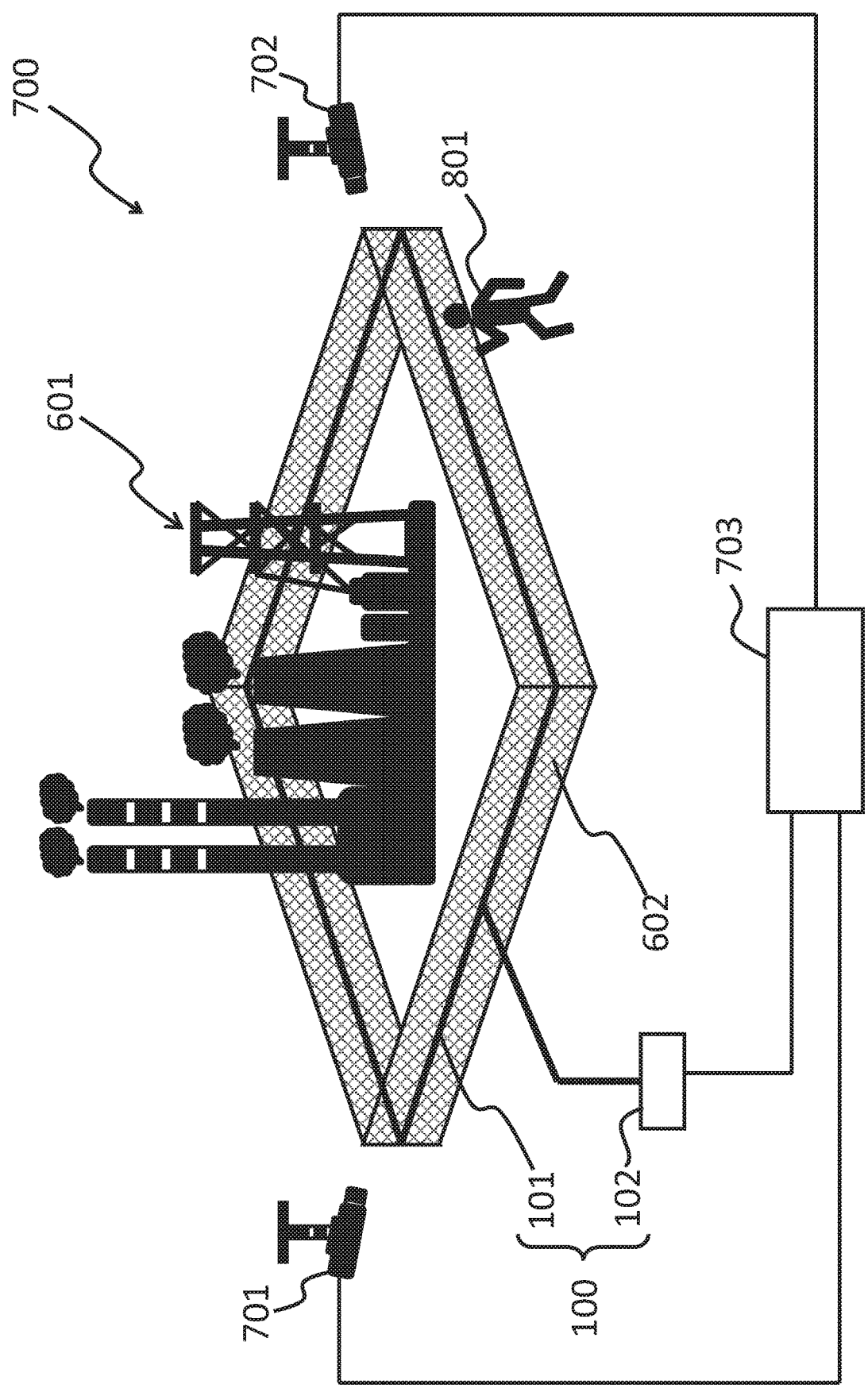
FIG. 6 is an image diagram showing an application example of an optical fiber cable of the optical fiber sensor according to the first exemplary embodiment.

Next, an application example of the optical fiber cable of the optical fiber sensor according to the first exemplary embodiment will be described with reference to the drawings. FIG. 6 is an image diagram showing an application example of the optical fiber cable of the optical fiber sensor according to the first exemplary embodiment.

The optical fiber cable 101 can be attached to an outer peripheral fence 602 of an important facility 601 such as, for example, a factory, power plant, an airport, a harbor or the like (see FIG. 6), or can be buried in the ground at an outer periphery of the important facility 601. The optical fiber sensor 100 that includes the optical fiber cable 101 and the apparatus main body 102 can detect an environmental change such as a sound or vibration occurring by an invader 801 due to use in combination with a monitoring system 700 that includes monitoring cameras 701 and 702 and a monitoring apparatus 703. In particular, in a case where the outer circumference of the facility 601 is a wide area, since it is difficult to always monitor the entire outer circumference by the monitoring cameras 701 and 702, the optical fiber sensor 100 can be used for the purpose of complementing the monitoring system 700. That is, when the optical fiber cable 101 detects a vibration or sound of the invader 801 and the apparatus main body 102 of the optical fiber sensor 100 gives an alarm, as a trigger for the alarm, it is possible to direct the monitoring cameras 701 and 702 (control the elevation/depression angle, azimuth angle of the monitoring cameras 701 and 702) to the places where an abnormality occurs, by control of the monitoring apparatus 703, and to record image information of the invader 801.

According to the first exemplary embodiment, it is possible to contribute to specifying a location where an environmental change occurs by the optical fiber cable 101, by converting received backscattered light to analog data; further converting to digital data; sampling at a specific frequency; and performing analysis (integration, variation amount calculation, threshold decision processing, comparison processing, estimation processing). Also, since the timing to be sampled is shorter than the width of light pulses at the time of transmission, specifying the location where an environmental change occurs, is facilitated.

Second Exemplary Embodiment

Figure 7:
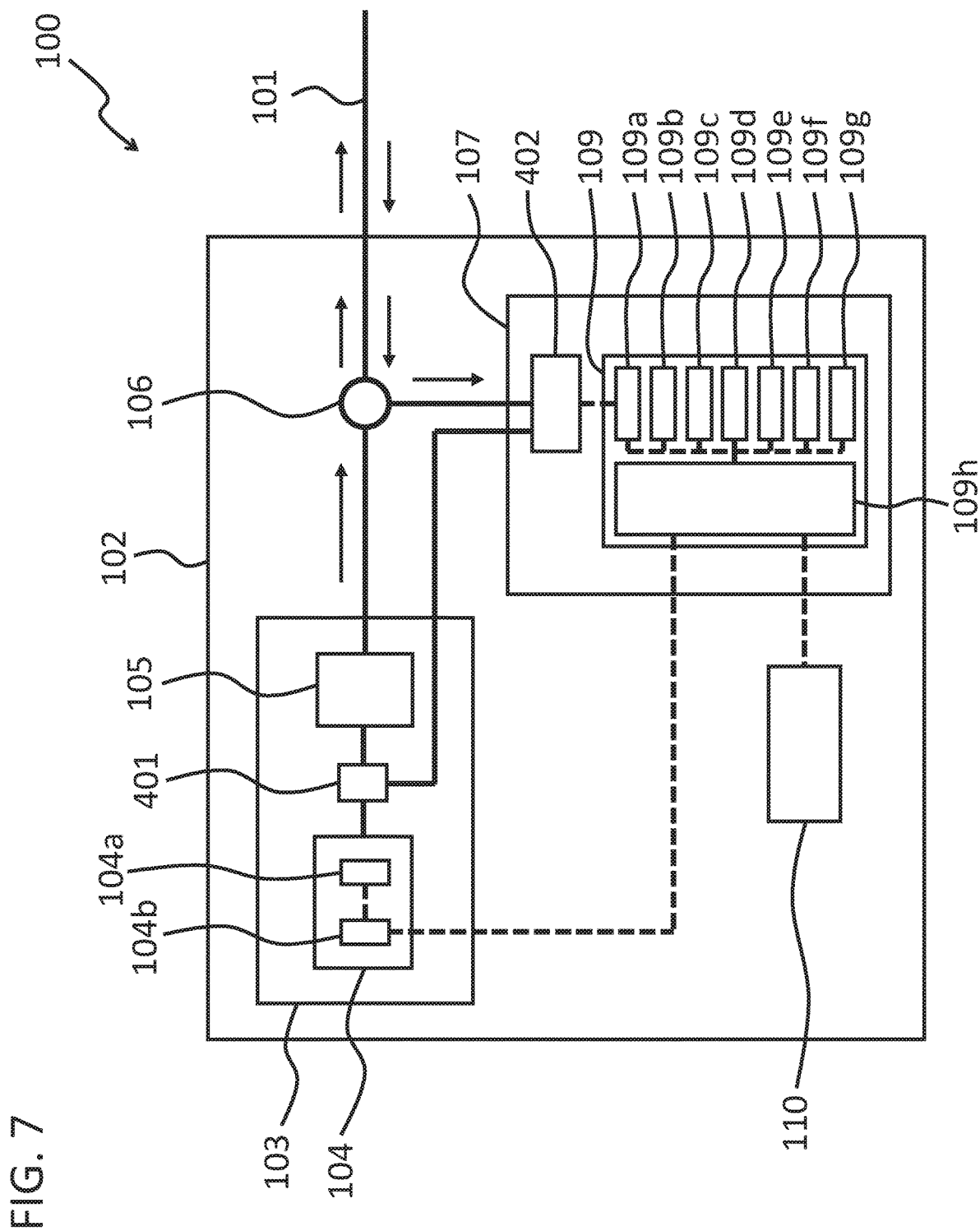
FIG. 7 is a block diagram schematically showing a configuration of an optical fiber sensor according to a second exemplary embodiment.

An optical fiber sensor according to a second exemplary embodiment will be described with reference to the drawings. FIG. 7 is a block diagram schematically showing a configuration of the optical fiber sensor according to the second exemplary embodiment.

The second exemplary embodiment is a modified example of the first exemplary embodiment; an optical coupler 401 is provided in a light path between a light source apparatus 104 and a light modulator 105, an optical coherent receiver 402 is used instead of an light detector (light detector 108 in FIG. 1), and the optical coupler 401 and the optical coherent receiver 402 are connected by a light path.

The optical coupler 401 is a part that divides light pulses outputted from the light source apparatus 104 into two. One of light pulses divided by the optical coupler 401 is outputted toward the light modulator, and the other of light pulses is outputted toward the optical coherent receiver 402 of the reception part 107.

The optical coherent receiver 402 is an instrument (apparatus) for measuring reflected scattered light according to a coherent detection scheme. The coherent detection scheme is a receiving scheme for measuring reflected scattered light at high sensitivity and low noise, by performing appropriate processing to a phase or polarization change in a digital region. Light from both light pulses from the optical coupler 401 and backscattered light from a circulator 106 are inputted to the optical coherent receiver 402. With regard to the backscattered light, since a frequency shift occurs by the light pulses being modulated by the light modulator 105, light of a different frequency is inputted at the same time to the optical coherent receiver 402. In the optical coherent receiver 402, measurement is performed of a beat frequency that occurs due to interference of optical signals (light pulses, backscattered light) of these 2 different frequencies. The beat frequency measured by the optical coherent receiver 402 is outputted toward an analog-digital conversion part 109a of the data processing apparatus 109, as analog data according to backscattered light. Reception timing of the backscattered light received by the optical coherent receiver 402 is synchronized with transmission timing of the light pulses outputted from the light source apparatus 104, by control of the control part 109h.

Configuration and operation otherwise are similar to the first exemplary embodiment.

According to the second exemplary embodiment, it is possible to contribute to specifying a location where an environmental change occurs in the optical fiber cable 101, similarly to the first exemplary embodiment. Also, by measuring reflected scattered light by the coherent detection scheme, it is possible to measure reflected scattered light at high intensity and low noise, and it is possible to grasp the state of an environmental change in detail according to change in intensity and phase of backscattered light.

Third Exemplary Embodiment

Figure 8:
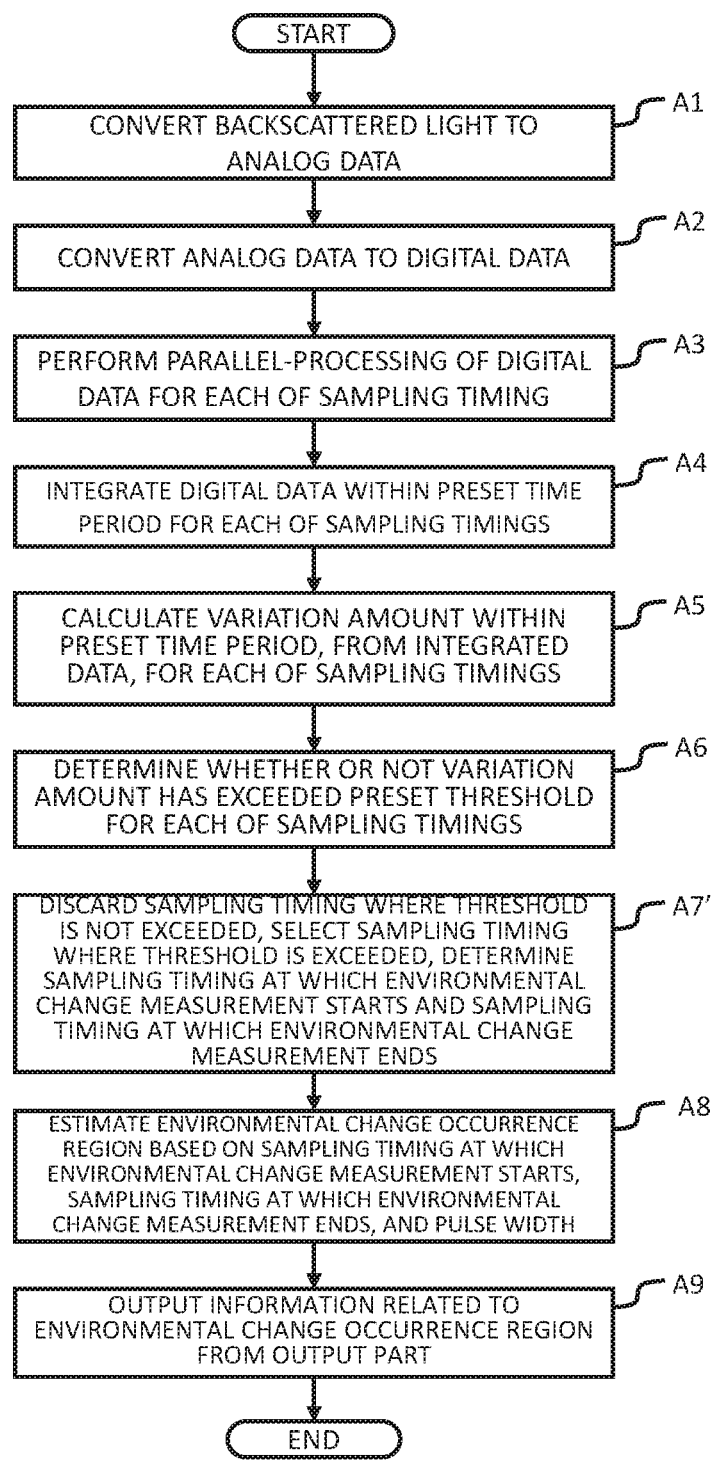
FIG. 8 is a sequence schematically showing operations of a data processing apparatus in an optical fiber sensor according to a third exemplary embodiment.

An optical fiber sensor according to a third exemplary embodiment will be described with reference to the drawings. FIG. 8 is a sequence schematically showing operations of a data processing apparatus in the optical fiber sensor according to the third exemplary embodiment. Since the configuration of the optical fiber sensor is similar to the first exemplary embodiment, please see FIG. 1.

The third exemplary embodiment is a modified example of the first exemplary embodiment; in a comparison part 109f of a data processing apparatus 109 of the optical fiber sensor 100, instead of using all variation amounts for each of sampling timings calculated as in the first exemplary embodiment, a sampling timing according to a variation amount where a decision is made that there is no environmental change in step A6, is discarded in step A7'. Also, a sampling timing according to a variation amount where a decision has been made that there is an environmental change in a case where a threshold is exceeded in step A6, is selected in step A7'.

After performing steps A1 to A6, in step A7', the comparison part 109f of the data processing apparatus 109 discards the sampling timing where a decision has been made that there is no environmental change in step A6; selects a sampling timing where a decision has been made that there is an environmental change; and in a case of discarding the sampling timing that is one before the selected sampling timing, determines that measurement of an environmental change in the selected sampling timing is started; and in a case of discarding the sampling timing that is one after the selected sampling timing, determines that measurement of an environmental change in the discarded sampling timing is ended (step A7'). Thereafter, step A8 is performed and ended.

In step A7', referring to the example of FIG. 4, sampling timings $t_1$ and $t_n$ where a decision has been made that there is no environmental change (variation amount is not exceeded the threshold) in step A6 are discarded, and sampling timings $t_2$ to $t_{n-1}$ where a decision has been made that there is an environmental change (variation amount is exceeded the threshold) are selected. Since the sampling timing $t_1$ that is one before the selected sampling timing $t_2$, is discarded, a determination is made that measurement of an environmental change in the selected sampling timing $t_2$ is started. Also, since the sampling timing $t_n$ that is one after the selected sampling timing $t_{n-1}$, is discarded, a determination is made that measurement of an environmental change in the discarded sampling timing $t_n$ is ended. Since the sampling timing $t_3$ that is one after the selected sampling timing $t_2$, is selected, a determination is not made that measurement of an environmental change is ended in this case. Also, since the sampling timing $t_{n-2}$ that is one before the selected sampling timing $t_{n-1}$, is selected, a determination is not made that measurement of an environmental change is started in this case. Also, as to the sampling timings $t_1$ and $t_{n-1}$, locations are specified with a distance resolution determined by used pulse width. Furthermore, it is desirable to be able to set sampling timings arbitrarily.

According to the third exemplary embodiment, it is possible to contribute to specifying a location where an environmental change occurs in the optical fiber cable 101, similarly to the first exemplary embodiment. Also, it is possible to specify in detail only a location where an environmental change occurs in a distance section of an optical fiber cable corresponding to the selected sampling timing(s).

Furthermore, it is possible to lower the load of data processing.

Fourth Exemplary Embodiment

Figure 9:
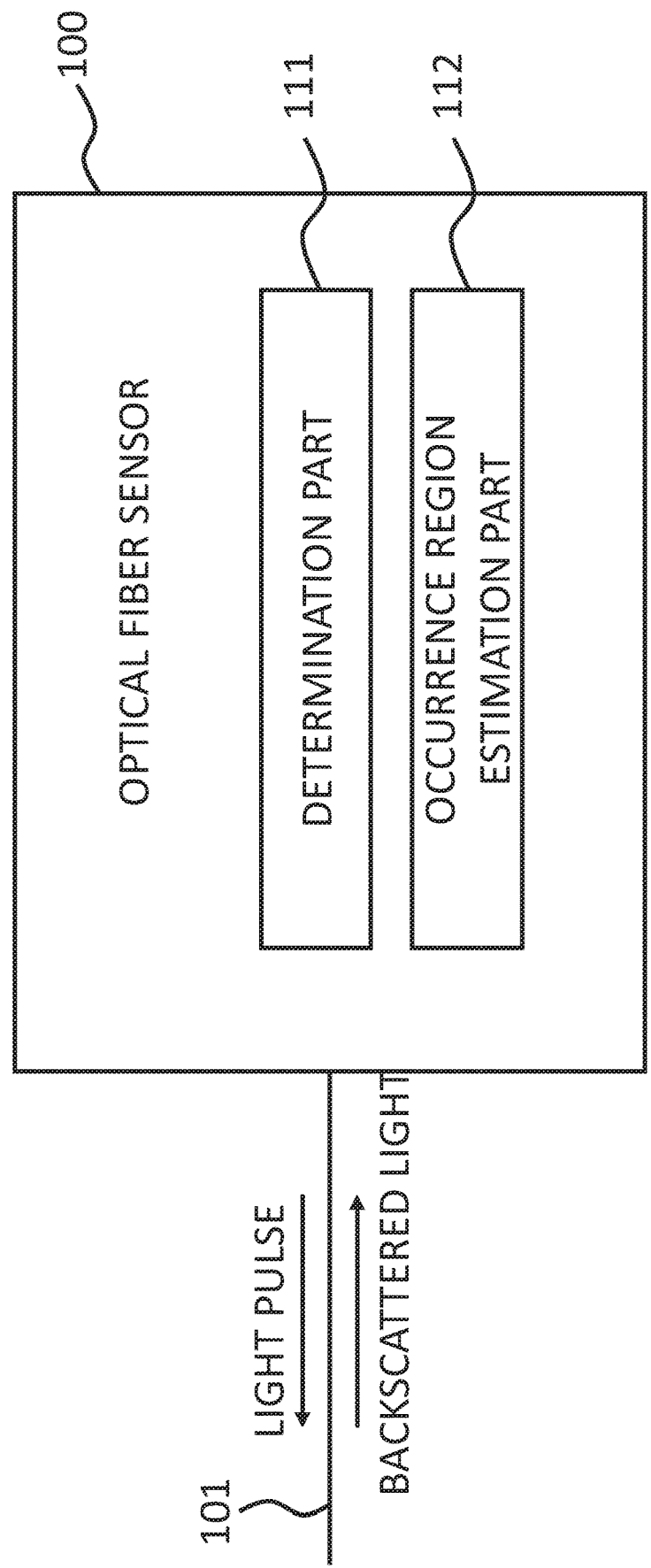
FIG. 9 is a block diagram schematically showing a configuration of an optical fiber sensor according to a fourth exemplary embodiment.

An optical fiber sensor according to a fourth exemplary embodiment will be described with reference to the drawings. FIG. 9 is a block diagram schematically showing a configuration of the optical fiber sensor according to the fourth exemplary embodiment.

The optical fiber sensor 100 is a sensor that irradiates light pulses into an optical fiber cable 101 and analyzes backscattered light thereof. The optical fiber sensor 100 comprises a determination part 111 and an occurrence region estimation part 112.

The determination part 111 determines a timing at which measurement of an environmental change starts, and a timing at which measurement of an environmental change ends, based on the backscattered light.

The occurrence region estimation part 112 estimates an occurrence region of the environmental change in a longitudinal direction of the optical fiber cable, based on the timing at which measurement of an environmental change starts; the timing at which measurement of an environmental change ends; and the pulse width of light pulses.

According to the fourth exemplary embodiment, it is possible to contribute to improving accuracy in specifying the location where an environmental change occurs by determining the timing at which measurement of an environmental change starts and the timing at which measurement of an environmental change ends, based on the received backscattered light.

Although some or all of the abovementioned exemplary embodiments may also be described as in the following modes, the exemplary embodiments are not limited thereto.
<Supplementary Note>

The present invention enables a mode of an optical fiber sensor according to the first aspect.

In the optical fiber sensor according to the first aspect, the determination part comprises: a parallel-processing part that performs sampling of digital data according to the backscattered light at a specific frequency and performs parallel-processing of digital data for each of sampling timings; a variation amount calculation part that calculates variation amount according to the digital data, for each of sampling timings; and a comparison part that determines a sampling timing at which measurement of environmental change starts, and a sampling timing at which measurement of environmental change ends, by comparing the variation amount according to the sampling timings; and wherein the occurrence region estimation part estimates an occurrence region of the environmental change in a longitudinal direction of the optical fiber cable, based on: the sampling timing at which measurement of the environmental change starts; the sampling timing at which measurement of the environmental change ends; and the pulse width of the light pulses.

In the optical fiber sensor according to the first aspect, the optical fiber sensor further comprises a threshold decision part that, by deciding whether or not a variation amount according to the digital data exceeds a preset threshold for each of sampling timings, decides that there is an environmental change in a case of exceeding the threshold, and decides that there is no environmental change in a case of not exceeding the threshold.

In the optical fiber sensor according to the first aspect, the comparison part compares a variation amount according to one sampling timing and a variation amount according to another sampling timing subsequent to the one sampling timing; thereby, determines a start of measurement of environmental change at a sampling timing when the variation amount becomes from a state less than the threshold to a state greater than or equal to the threshold; and determines an end of measurement of environmental change at a sampling timing when the variation amount becomes from a state greater than or equal to the threshold to a state less than the threshold, between the compared variation amounts.

In the optical fiber sensor according to the first aspect, the comparison part discards a sampling timing where a decision has been made that there is no environmental change by the threshold decision part; selects a sampling timing where a decision has been made that there is an environmental change; in a case of discarding the sampling timing that is one before the selected sampling timing, determines the start of measurement of environmental change in the selected sampling timing; and in a case of discarding the sampling timing that is one after the selected sampling timing, determines the end of measurement of environmental change in the discarded sampling timing.

In the optical fiber sensor according to the first aspect, the optical fiber sensor further comprises: a light source apparatus that outputs the light pulses; a light modulator that modulates the light pulses outputted from the light source apparatus, and outputs the modulated light pulses; a light detector that detects the backscattered light and outputs analog data according to the backscattered light; an analog-digital conversion part that converts the analog data according to the backscattered light to the digital data according to the backscattered light; and a circulator that irradiates light pulses outputted from the light modulator toward into the optical fiber cable, and outputs the backscattered light that has been returned from the optical fiber cable toward the light detector.

In the optical fiber sensor according to the first aspect, the optical fiber sensor further comprises: a light source apparatus that outputs the light pulses; an optical coupler that divides the light pulses outputted from the light source apparatus into two; a light modulator that modulates the light pulses outputted from the optical coupler, and outputs the modulated light pulses; an optical coherent receiver to which the light pulses outputted from the optical coupler and the backscattered light are inputted, that measures a beat frequency occurring due to interference of the light pulses and the backscattered light, and that outputs the measured beat frequency as analog data according to the backscattered light; an analog-digital conversion part that converts the analog data according to the backscattered light to the digital data according to the backscattered light; and a circulator that irradiates the light pulses outputted from the light modulator toward into the optical fiber cable, and outputs the backscattered light that has been returned from the optical fiber cable toward the optical coherent receiver.

In the optical fiber sensor according to the first aspect, the optical fiber sensor further comprises an integration part that calculates integration data obtained by integrating the digital data in which parallel-processing is performed, within a preset time period, for each of sampling timings; wherein the variation amount calculation part calculates the variation amount according to the integration data, as the variation amount according to the digital data, for each of sampling timings.

In the optical fiber sensor according the first aspect, the optical fiber sensor further comprises a controller that synchronizes a transmission timing of the light pulses outputted from the light source apparatus and a detection timing of the backscattered light detected by the light detector.

The optical fiber sensor according the first aspect, the optical fiber sensor further comprises a controller that synchronizes a transmission timing of the light pulses outputted from the light source apparatus and a reception timing of the backscattered light received by the optical coherent receiver.

The optical fiber sensor according the first aspect, the controller controls so that the sampled time period is shorter than the pulse width.

The present invention enables a mode of monitoring system according to the second aspect.

The present invention enables a mode of an analysis method according to the third aspect.

The present invention enables a mode of a program according to the fourth aspect.

It should be noted that the disclosures of the abovementioned non-patent literature are incorporated herein by reference thereto. Modifications and adjustments of exemplary embodiments and examples can be made within the bounds of the entire disclosure (including claims and the drawings) of the present invention, and also based on fundamental technological concepts thereof. Also, various combinations and/or selections (or unselected as necessary) of various disclosed elements (including respective elements of the respective claims, respective elements of the respective exemplary embodiments and examples, respective elements of the respective drawings, and the like) are possible within the scope of the entire disclosure of the present invention. That is, the present invention clearly includes every type of transformation and modification that a person skilled in the art can realize according to the entire disclosure including claims and drawings, and to technological concepts thereof. Also, with regard to numerical values and numerical ranges described in the present application, arbitrary intermediate values, lower numerical values and small ranges should be interpreted to be described even where there is no explicit description thereof.

REFERENCE SIGNS LIST 100 optical fiber sensor
101 optical fiber cable
102 apparatus main body
103 transmission part
104 light source apparatus
104a light output element
104b drive circuit
105 light modulator
106 circulator
107 reception part
108 light detector
109 data processing apparatus
109a analog-digital conversion part
109b parallel-processing part (determination part)
109c integration part
109d variation amount calculation part (determination part))
109e threshold decision part
109f comparison part (determination part)
109g occurrence region estimation part
109h control part
110 output part
111 determination part
112 occurrence region estimation part
401 optical coupler
402 optical coherent receiver
601 important facility
602 outer peripheral fence
700 monitoring system
701, 702 monitoring camera
703 monitoring apparatus
801 invader

The invention claimed is:

1. An optical fiber sensor that irradiates light pulses into an optical fiber cable and analyses backscattered light thereof, the optical fiber sensor comprising:
    a determination part that determines a timing at which measurement of an environmental change starts and a timing at which measurement of the environmental change ends, based on the backscattered light; and
    an occurrence region estimation part that estimates an occurrence region of the environmental change in a longitudinal direction of the optical fiber cable, based on: the timing at which measurement of the environmental change starts; the timing at which measurement of the environmental change ends; and a pulse width of the light pulses.

2. The optical fiber sensor according to claim 1, wherein the determination part comprises:
    a parallel-processing part that performs sampling of digital data according to the backscattered light at a specific frequency, and performs parallel-processing of digital data for each of sampling timings;
    a variation amount calculation part that calculates variation amount according to the digital data for each of sampling timings; and
    a comparison part that determines a sampling timing at which measurement of environmental change starts and a sampling timing at which measurement of environmental change ends, by comparing the variation amount according to the sampling timings; and wherein
    the occurrence region estimation part estimates an occurrence region of the environmental change in the longitudinal direction of the optical fiber cable, based on: the sampling timing at which measurement of the environmental change starts; the sampling timing at which measurement of the environmental change ends; and the pulse width of the light pulses.

3. The optical fiber sensor according to claim 2 further comprising: a threshold decision part that, by deciding whether or not a variation amount according to the digital data exceeds a preset threshold for each of sampling timings, decides that there is an environmental change in a case of exceeding the threshold, and decides that there is no environmental change in a case of not exceeding the threshold.

4. The optical fiber sensor according to claim 3,
    wherein the comparison part
    discards a sampling timing where a decision has been made that there is no environmental change by the threshold decision part;
    selects a sampling timing where a decision has been made that there is an environmental change;
    in a case of discarding the sampling timing that is one before the selected sampling timing, determines a start of measurement of environmental change in the selected sampling timing; and
    in a case of discarding the sampling timing that is one after the selected sampling timing, determines an end of measurement of environmental change in the discarded sampling timing.

5. The optical fiber sensor according to claim 4, further comprising:
    a light source apparatus that outputs the light pulses;
    a light modulator that modulates the light pulses outputted from the light source apparatus, and outputs the modulated light pulses;
    a light detector that detects the backscattered light and outputs analog data according to the backscattered light;
    an analog-digital conversion part that converts the analog data according to the backscattered light to the digital data according to the backscattered light; and
    a circulator that irradiates the light pulses outputted from the light modulator toward into the optical fiber cable, and outputs the backscattered light that has been returned from the optical fiber cable toward the light detector.

6. The optical fiber sensor according to claim 5, further comprising:
    a light source apparatus that outputs the light pulses;

an optical coupler that divides the light pulses outputted from the light source apparatus into two;
a light modulator that modulates the light pulses outputted from the optical coupler, and outputs the modulated light pulses;
an optical coherent receiver to which the light pulses outputted from the optical coupler and the backscattered light are inputted; that measures a beat frequency occurring due to interference of the light pulses and the backscattered light; and that outputs the measured beat frequency as analog data according to the backscattered light;
an analog-digital conversion part that converts the analog data according to the backscattered light to the digital data according to the backscattered light; and
a circulator that irradiates the light pulses outputted from the light modulator toward into the optical fiber cable, and outputs the backscattered light that has been returned from the optical fiber cable toward the optical coherent receiver.

7. The optical fiber sensor according to claim 3,
wherein the comparison part
compares a variation amount according to one sampling timing, and a variation amount according to another sampling timing subsequent to the one sampling timing; thereby,
determines a start of measurement of environmental change at a sampling timing when the variation amount becomes from a state less than the threshold to a state greater than or equal to the threshold, and
determines an end of measurement of environmental change at a sampling timing when the variation amount becomes from a state greater than or equal to the threshold to a state less than the threshold, between the compared variation amounts.

8. The optical fiber sensor according to claim 3, further comprising:
a light source apparatus that outputs the light pulses;
a light modulator that modulates the light pulses outputted from the light source apparatus, and outputs the modulated light pulses;
a light detector that detects the backscattered light and outputs analog data according to the backscattered light;
an analog-digital conversion part that converts the analog data according to the backscattered light to the digital data according to the backscattered light; and
a circulator that irradiates the light pulses outputted from the light modulator toward into the optical fiber cable, and outputs the backscattered light that has been returned from the optical fiber cable toward the light detector.

9. The optical fiber sensor according to claim 3, further comprising:
a light source apparatus that outputs the light pulses;
an optical coupler that divides the light pulses outputted from the light source apparatus into two;
a light modulator that modulates the light pulses outputted from the optical coupler, and outputs the modulated light pulses;
an optical coherent receiver to which the light pulses outputted from the optical coupler and the backscattered light are inputted; that measures a beat frequency occurring due to interference of the light pulses and the backscattered light; and that outputs the measured beat frequency as analog data according to the backscattered light;
an analog-digital conversion part that converts the analog data according to the backscattered light to the digital data according to the backscattered light; and
a circulator that irradiates the light pulses outputted from the light modulator toward into the optical fiber cable, and outputs the backscattered light that has been returned from the optical fiber cable toward the optical coherent receiver.

10. The optical fiber sensor according to claim 2,
wherein the comparison part
compares a variation amount according to one sampling timing, and a variation amount according to another sampling timing subsequent to the one sampling timing; thereby,
determines a start of measurement of environmental change at a sampling timing when the variation amount becomes from a state less than the threshold to a state greater than or equal to the threshold, and
determines an end of measurement of environmental change at a sampling timing when the variation amount becomes from a state greater than or equal to the threshold to a state less than the threshold, between the compared variation amounts.

11. The optical fiber sensor according to claim 10, further comprising:
a light source apparatus that outputs the light pulses;
a light modulator that modulates the light pulses outputted from the light source apparatus, and outputs the modulated light pulses;
a light detector that detects the backscattered light and outputs analog data according to the backscattered light;
an analog-digital conversion part that converts the analog data according to the backscattered light to the digital data according to the backscattered light; and
a circulator that irradiates the light pulses outputted from the light modulator toward into the optical fiber cable, and outputs the backscattered light that has been returned from the optical fiber cable toward the light detector.

12. The optical fiber sensor according to claim 10, further comprising:
a light source apparatus that outputs the light pulses;
an optical coupler that divides the light pulses outputted from the light source apparatus into two;
a light modulator that modulates the light pulses outputted from the optical coupler, and outputs the modulated light pulses;
an optical coherent receiver to which the light pulses outputted from the optical coupler and the backscattered light are inputted; that measures a beat frequency occurring due to interference of the light pulses and the backscattered light; and that outputs the measured beat frequency as analog data according to the backscattered light;
an analog-digital conversion part that converts the analog data according to the backscattered light to the digital data according to the backscattered light; and
a circulator that irradiates the light pulses outputted from the light modulator toward into the optical fiber cable, and outputs the backscattered light that has been returned from the optical fiber cable toward the optical coherent receiver.

13. The optical fiber sensor according to claim 2, further comprising:
a light source apparatus that outputs the light pulses;

a light modulator that modulates the light pulses outputted from the light source apparatus, and outputs the modulated light pulses;

a light detector that detects the backscattered light and outputs analog data according to the backscattered light;

an analog-digital conversion part that converts the analog data according to the backscattered light to the digital data according to the backscattered light; and a circulator that irradiates the light pulses outputted from the light modulator toward into the optical fiber cable, and outputs the backscattered light that has been returned from the optical fiber cable toward the light detector.

14. The optical fiber sensor according to claim 13 further comprising a controller that synchronizes a transmission timing of the light pulses outputted from the light source apparatus and a detection timing of the backscattered light detected by the light detector.

15. The optical fiber sensor according to claim 14, wherein the controller controls so that the sampled time period is shorter than the pulse width.

16. The optical fiber sensor according to claim 2, further comprising:

a light source apparatus that outputs the light pulses;

an optical coupler that divides the light pulses outputted from the light source apparatus into two;

a light modulator that modulates the light pulses outputted from the optical coupler, and outputs the modulated light pulses;

an optical coherent receiver to which the light pulses outputted from the optical coupler and the backscattered light are inputted; that measures a beat frequency occurring due to interference of the light pulses and the backscattered light; and that outputs the measured beat frequency as analog data according to the backscattered light;

an analog-digital conversion part that converts the analog data according to the backscattered light to the digital data according to the backscattered light; and a circulator that irradiates the light pulses outputted from the light modulator toward into the optical fiber cable, and outputs the backscattered light that has been returned from the optical fiber cable toward the optical coherent receiver.

17. The optical fiber sensor according to claim 16 further comprising a controller that synchronizes a transmission timing of the light pulses outputted from the light source apparatus and reception timing of the backscattered light received by the optical coherent receiver.

18. The optical fiber sensor according to claim 2, further comprising:

an integration part that calculates integration data obtained by integrating the digital data in which parallel-processing is performed, within a preset time period, for each of sampling timings; wherein the variation amount calculation part calculates the variation amount according to the integration data, as the variation amount according to the digital data, for each of sampling timings.

19. An analysis method that comprises: irradiating light pulses into an optical fiber cable; and analyzing backscattered light thereof, the analysis method comprising:

determining a timing at which measurement of an environmental change starts and a timing at which measurement of the environmental change ends, based on the backscattered light; and estimating an occurrence region of the environmental change in a longitudinal direction of the optical fiber cable, based on the timing at which measurement of the environmental change starts; the timing at which measurement of the environmental change ends; and pulse width of the light pulses.

20. A non-transient computer readable recording medium storing a program executed in an optical fiber sensor that irradiates light pulses into an optical fiber cable and analyses backscattered light thereof, the program causing to:

determine a timing at which measurement of an environmental change starts and a timing at which measurement of the environmental change ends, based on the backscattered light; and estimate an occurrence region of the environmental change in a longitudinal direction of the optical fiber cable, based on the timing at which measurement of the environmental change starts, the timing at which measurement of the environmental change ends, and a pulse width of the light pulses.

* * * * *